(12) United States Patent
Bloemendaal et al.

(10) Patent No.: US 9,788,492 B2
(45) Date of Patent: Oct. 17, 2017

(54) BIN AERATION SYSTEM

(75) Inventors: Brent J. Bloemendaal, Zionsville, IN (US); Ross Alan Mielke, Westfield, IN (US); Brandon Stephen Mullen, Whitestown, IN (US)

(73) Assignee: CTB, Inc., Milford, IN (US)

( * ) Notice: Subject to any disclaimer, the term of this patent is extended or adjusted under 35 U.S.C. 154(b) by 899 days.

(21) Appl. No.: 13/180,797

(22) Filed: Jul. 12, 2011

(65) Prior Publication Data
US 2013/0015251 A1    Jan. 17, 2013

(51) Int. Cl.
*F24F 7/007* (2006.01)
*F24F 11/04* (2006.01)
*A01F 25/22* (2006.01)

(52) U.S. Cl.
CPC .................................. *A01F 25/22* (2013.01)

(58) Field of Classification Search
CPC ........................... F26B 17/122; F26B 25/009
USPC .................................................. 700/275, 277
See application file for complete search history.

(56) References Cited

U.S. PATENT DOCUMENTS

| | | |
|---|---|---|
| 4,037,527 A | 7/1977 | Steffen |
| 4,281,489 A | 8/1981 | Kallestad et al. |
| 4,306,490 A | 12/1981 | Kallestad |
| 4,522,335 A | 6/1985 | Kallestad et al. |
| 4,688,332 A | 8/1987 | Kallestad et al. |
| 4,930,229 A | 6/1990 | Moser |
| 5,893,218 A | 4/1999 | Hunter et al. |
| 6,530,160 B1 | 3/2003 | Gookins |
| 7,004,401 B2 | 2/2006 | Kallestad |
| 7,240,029 B2 | 7/2007 | Kallestad |
| 7,243,857 B2 | 7/2007 | Kallestad |
| 7,472,070 B2 | 12/2008 | Kallestad |
| 2002/0121905 A1* | 9/2002 | Salmon, Jr. .................... 324/602 |
| 2003/0033057 A1* | 2/2003 | Kallestad ................ A01F 25/22 700/277 |
| 2003/0064676 A1* | 4/2003 | Federspiel ............. B61D 27/00 454/75 |
| 2003/0079365 A1 | 5/2003 | Corak et al. |
| 2005/0091872 A1* | 5/2005 | Gracff ............................. 34/359 |
| 2006/0100745 A1 | 5/2006 | Kallestad |
| 2006/0108434 A1 | 5/2006 | Kallestad |
| 2008/0188173 A1* | 8/2008 | Chen et al. .................... 454/239 |
| 2009/0094853 A1* | 4/2009 | Noyes et al. .................... 34/233 |

(Continued)

OTHER PUBLICATIONS

"Resistance to Airflow of Grains, Seeds, Other Agricultural Products, and Perforated Metal Sheets"; pp. 528-538; Mar. 1996; ASAE Standards 1998.

(Continued)

*Primary Examiner* — Miranda Huang
*Assistant Examiner* — John Park
(74) *Attorney, Agent, or Firm* — Harness Dickey

(57) ABSTRACT

A system for controlling the aeration of a grain bin storage device. The system comprises a grain bin storage device, a ventilation fan, a variable fan drive motor, and a controller configured to receive user input and grain bin storage device parameters. The system controls operation of the ventilation fan at various speeds to maintain a desired volumetric flow rate per bushel of grain. The controller monitors the static pressure within the grain bin storage device and adjusts the speed of the ventilation fan based on an optimal static pressure derived from the user input and grain bin storage device parameters.

20 Claims, 6 Drawing Sheets

(56) References Cited

U.S. PATENT DOCUMENTS

2009/0143915 A1* 6/2009 Dougan et al. .............. 700/276
2009/0211110 A1 8/2009 Bartol
2010/0229420 A1* 9/2010 Garrido et al. ................ 34/493
2010/0273412 A1 10/2010 Will

OTHER PUBLICATIONS

"Management of Stored Grain With Aeration—Airflow and Equipment"; Revised 1991.
S.J. Ray, L.O. Pordesimo, LR. Wilhelm; "Airflow Resistance of some Pelleted Feed"; vol. 47(2): pp. 513-519; "Transactions of the ASAE"; © 2004 American Society of Agricultural Engineers ISSN 0001-2351.
S.O. Jekayinfa; "Effect of Airflow Rate, Moisture Content and Pressure Drop on the Airflow Resistance of Locust Bean Seed"; May 2006; Agricultural Engineering International; the CIGR Ejournal. Manuscript FP 06 010. vol. VIII.
Paul Sumner; "Harvesting and Drying Corn"; A Guide To Corn Production In Georgia, University of Georgia, 2013, pp. 76-86 (http://www.uaex.edu/publications/PDF/MP297/9_storage.pdf).
D. Garg, D.E. Maier; "Modeling non-uniform airflow distribution in large grain silos using Fluent", pp. 754-762; $9^{th}$ International Working Conference on Stored Product Protection, Oct. 15-18, 2006, Sao Paulo, Brazil (http://spiru.cgahr.ksu.edu/proj/iwcspp/iwcspp9.html).
Dennis R. Gardisser; "9—on Farm Storage and Drying"; Grain Sorghum Production Handbook, University of Arkansas, Current, pp. 55-60 (http://search.uaex.edu/search?q=on+farm+storage+and+drying&site=default_collection&client=uaex&proxystylesheet=uaex).
Office Action dated Jun. 12, 2015 in corresponding Canadian Patent Application No. 2,782,952.
Office Action dated Apr. 4, 2016 in corresponding Canadian Patent Application No. 2,782,952.

* cited by examiner

BIN AERATION SYSTEM

FIELD

The present disclosure relates to a method and system for the controlled aeration of a grain bin storage device.

BACKGROUND

This section provides background information related to the present disclosure which is not necessarily prior art.

The distribution and circulation of air within a grain bin storage device has an important effect on the ecosystem of a stored material. Drying is known as an essential method of preserving food and feedstock. Proper aeration of grain and other feed assists in the drying process while maintaining desired internal moisture levels of the grain or feed. Thus, various structures, such as grain bins and other feed storage units, may use ventilation systems in an attempt to maintain a selected environment. The ventilation systems can help ensure that a supply of fresh air and acceptable levels of various properties, such as moisture content, are maintained within the structure. The ventilation systems are generally used to move volumes of air and may include various fan units to move the air.

Bin ventilation systems are often sized for a bin or storage unit that is completely full. It is often preferred, however, that bin aeration levels (cfm/bushel) be held constant regardless of the quantity, or bin fill level. Thus, a fan running at a constant speed will likely not be able to maintain the preferred aeration level at various different fill levels without user intervention. By way of example, a typical large farm bin may use two 40 hp fans that run constantly after the drying process starts, regardless of the bin fill level. However, the actual required power may only be a few horsepower until the bin is filled with grain or feed. If the amount of air supply is too large, the grain or feed may be cooled too rapidly, negatively affecting the overall amount of moisture to be removed while using excess energy. Thus, when multiple fans are used, some fans may need to be turned off periodically, or run for only a specified period of time. This may cause undesired periods of no air flow. Accordingly, there remains a need for minimizing the energy used in the drying and cooling process, while maintaining consistent air flow adequate for the proper moisture content.

SUMMARY

This section provides a general summary of the disclosure, and is not a comprehensive disclosure of its full scope or all of its features.

According to some embodiments a method for controlling aeration of a grain bin storage device is provided. The method includes (a) receiving user input information into a controller; (b) obtaining a fill height level of the grain bin storage device; (c) determining a desired airflow rate based on the fill height level; (d) calculating a control parameter target having a mathematical relationship to a static pressure within the grain bin storage device, wherein the control parameter target is calculated to achieve the desired airflow rate; (e) outputting a signal operating a ventilation fan at a predetermined fan speed; (f) receiving an input measuring an operating static pressure and providing a signal representative of the operating static pressure to the controller; (g) determining an operating control parameter based on the operating static pressure, wherein the operating control parameter has the same mathematical relationship to the static pressure as the control parameter target; (h) comparing the operating control parameter to the control parameter target and, if necessary, outputting a signal adjusting the predetermined fan speed to cause the operating control parameter to move toward the control parameter target; and (i) upon a triggering event, repeating steps (b)-(h).

According to other embodiments and features, a method for controlling aeration of a grain bin storage device is provided. The method comprises (a) receiving user input information into a controller; (b) outputting a signal operable to operate the ventilation fan at a test fan speed; (c) receiving an input measuring a test static pressure within the grain bin storage device at the test fan speed and providing a signal representative of the operating static pressure to the controller; (d) calculating a test airflow rate of the ventilation fan based on the test fan speed and test static pressure; (e) calculating the fill height level of the grain bin storage device based upon the test airflow rate; (f) determining a desired airflow rate based on the fill height level; (g) calculating a control parameter target having a mathematical relationship to a static pressure within the grain bin storage device, wherein the control parameter target is calculated to achieve the desired airflow rate; (h) outputting a signal operating a ventilation fan at a predetermined fan speed; (i) receiving an input measuring an operating static pressure and providing a signal representative of the operating static pressure to the controller; (j) determining an operating control parameter based on the operating static pressure, wherein the operating control parameter has the same mathematical relationship to the static pressure as the control parameter target; (k) comparing the operating control parameter to the control parameter target and, if necessary, outputting a signal adjusting the predetermined fan speed to cause the operating control parameter to move toward the control parameter target; and (l) upon a triggering event, repeating steps (b)-(k).

In still other embodiments, a system to control aeration of a grain bin storage device including a ventilation fan operably coupled to a drive motor to drive the ventilation fan at variable speeds and a static pressure sensor within the grain bin storage device is provided. The system comprises a controller programmed to: (a) receive a plurality of user inputs; (b) calculate a desired airflow rate to be produced by the ventilation fan based upon a volume of grain present in the grain bin storage device and at least one of the plurality of user inputs; (c) receive input from the pressure sensor; (d) use a mathematical relationship between pressure and airflow rate to generate a control signal operable to operate the ventilation fan at a speed approaching the desired airflow rate.

Further areas of applicability will become apparent from the description provided herein. The description and specific examples in this summary are intended for purposes of illustration only and are not intended to limit the scope of the present disclosure.

DRAWINGS

Figure 1:
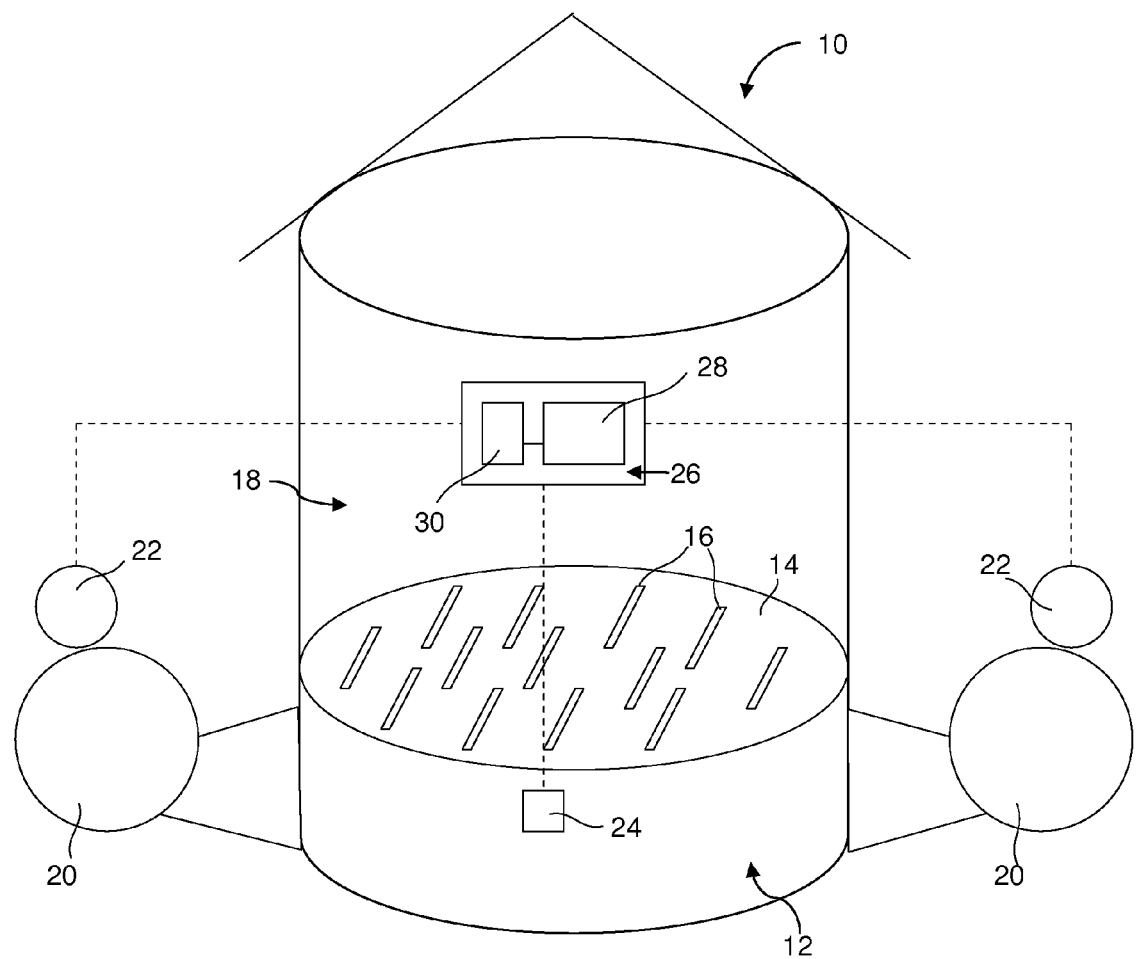
FIG. 1 is a schematic representation of an exemplary system, including a grain bin storage device, for controlling aeration of a grain bin storage device according to the principles of the present technology.

It should be noted that the figures set forth herein are intended to exemplify the general characteristics of materials, methods and devices among those of the present technology, for the purpose of the description of certain embodiments. These figures may not precisely reflect the characteristics of any given embodiment, and are not necessarily intended to define or limit specific embodiments within the scope of this technology.

DETAILED DESCRIPTION

The following description of exemplary embodiments and their use is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Detailed Description.

The present technology relates to the aeration of grain bin storage devices, and methods and systems for controlling the same. Aeration of grain bin storage devices is important in maintaining proper moisture levels in order to safely keep grain in storage for a prolonged period of time.

As used herein, a grain bin storage device refers to and includes any large container for storing something in bulk, such as grain, typically found on farms and/or used in commercial agricultural applications. Grain or feed bin storage devices may be any appropriate housing configured for grain or feed storage. They typically include sidewalls and a roof. Such bins can be generally round structures that include a raised floor creating an air plenum beneath the grain or feed. The floor can be perforated so that air can pass from the plenum through the floor and grain to remove moisture from the grain and/or adjust the temperature. Typically, a large number of small perforations is preferred to a smaller number of larger perforations for the same amount of opening in the plenum. Multiple fans can be arranged around the bin to push air into and out of the air plenum.

As used herein, the terms grain and feed, whether used singly or in combination, refer to and include various farm and/or agricultural products and materials useful with the present technology, including as non-limiting examples: all types of grains, seeds, corn, beans, rice, wheat, oats, barley, pods, potatoes, nuts, etc.

When grain or feed is dried, the amount of air required to carry away the removed moisture dictates a minimum airflow (cubic feet per minute per bushel, or cfm/bu) to be supplied. As is known in the art, the level of moisture removed from the grain or feed is related to the temperature difference between the air supply and the grain or feed. For a given grain, grain moisture content, grain temperature, air temperature, and relative humidity, there is a practical limit to how fast moisture can be removed from the grain. There comes a point where additional increases in airflow can result in reduced efficiency, if not reduced moisture removal. Maintaining a desired airflow rate (e.g., cfm/bu) can insure efficient moisture removal below the practical limit. Moisture removal levels may be approximated based on a calculated cfm flow rate of air supplied for a particular grain storage bin. Such moisture removal level determinations may not be accurate, however, if the grain storage bin is not full. This is because both the total airflow (e.g. cfm) and the airflow per volume of grain in the bin (e.g., cfm/bu) are dependent upon the fill level of the grain bin.

The air itself serves two main functions in grain drying. First, the air supplies the necessary heat for moisture evaporation; second, the air is a carrier of the evaporated moisture. As is well known, the amount of moisture that can be removed from grain depends on the type, variety, and quality of the grain, the moisture content of the grain, the temperature of the grain, and the drying air's temperature and relative humidity.

Hot air holds more moisture than cold air. Accordingly, air temperature affects the overall water-carrying capacity of the drying air. By way of example, one pound of air at 40° F. can hold about 40 grains of moisture, while one pound of air at 80° F. can hold a four fold increase of about 155 grains. Relative humidity also plays an important part in the drying process. For example, air at 100° F. and 50% relative humidity can absorb 60 more grains of moisture per pound of air than 100° F. air can at 75% humidity. Thus, the amount of moisture to be removed varies with temperature and humidity of the supplied air as well as the temperature difference of the grain and the supplied air.

Grain within a storage bin will maintain its moisture content and temperature over a period of time due to the semi-isolated environment of the storage bin and the inherent insulative properties of the grain mass. It is known that for a given type of grain, the ambient temperature and relative humidity determine an equilibrium moisture content, which represents the moisture content that the grain will equalize to if exposed for a prolonged period of time to that temperature and relative humidity condition. The equilibrium moisture content can be determined either from a table of known values, or from a mathematical formulation that approximates the data in such a table. The present technology makes this type of information for various grains available through a process controller. Alternatively, this information may be entered by a user, or obtained through various sources using internet communications or the like.

While ventilation fans may be sized for their worst case grain type, they may often be oversized or run the risk of stalling. Additionally, the fan horsepower requirements needed for a grain bin storage device as it is being filled is much less than when the grain bin storage device is full.

As grain bins are filled and the grain depth increases, it may become more difficult to pass air up through the grain. As the bin fill height increases, there is also less air available for each bushel. High volumes of air are needed to carry the moisture away in a timely fashion when the grain is at high moisture levels.

In order to take full advantage of minimizing the energy used in the drying and cooling processes, the airflow (cfm) should be carefully controlled. The present disclosure provides a control method of using pressure measurements at known airflow rates to approximate the amount of grain in a bin. Once that level is known, the pressure at the optimal airflow rate per volume of grain (cfm/bu) is determined and the ventilation fans are adjusted to optimal speeds and are monitored along with any changes in the amount of grain in the bin. These and other features of the disclosure will now be discussed in more detail.

Referring to FIG. 1, a system for controlling the aeration of a grain bin storage device includes a grain bin storage device 10, which can include air plenum 12 under grain bin floor 14 having a plurality of apertures or slots 16 through which air may flow from the air plenum 12 into the grain storage area 18 above the floor 14. One or more ventilation fans 20 can be provided, each fan 20 can have a corresponding variable frequency drive motor 22. A pressure sensor 24 is located in the air plenum 12 adjacent the grain bin floor 14. This air plenum 12 in which the pressure sensor 24 is typically located includes the entire airflow path between the fan or fans 20 and the grain mass, and generally ends at about the floor 14 where the air enters the grain mass (not shown). A processor or controller 26, including a microprocessor 28 and memory 30, can be configured to receive user input and/or grain bin storage device parameters. The controller 26 is also operably coupled to pressure sensor 24 and the fan motors 22. This coupling can, for example, be via wired or wireless connection represented by the dashed lines.

The system controls operation of the ventilation fan 20 at various speeds to maintain a desired volumetric flow rate per bushel of grain. The controller 26 monitors the static pressure within the grain bin storage device via pressure sensor 24 and adjusts the speed of the ventilation fan 20 based on the desired volumetric flow rate and an optimal static pressure derived from the user input and grain bin storage device parameters. Controller 26 is programmed as desired to have certain data (for example in memory 30) and to perform various steps. For example, such programming can include information received by controller 26 into memory from a user or from the manufacturer. Programming may also be provided by the physical design of microprocessor 28 of controller 26, by the use of software loaded into the controller 26, or a combination of hardware and software design.

FIGS. 2 through 5 depict flow diagrams illustrating various aspects of exemplary systems and methods for controlling aeration of a grain bin storage device. As should be understood, the figures illustrate various embodiments of the present technology and are not to be considered the only representations of the present technology. Certain method boxes illustrate optional steps or processes. It should further be understood that while separate boxes may be illustrated as being separate steps, various embodiments will combine or modify steps or processes, and the combination or omission of certain features, including changing the order of the illustrated steps, are all within the scope of the present disclosure.

Figure 2:
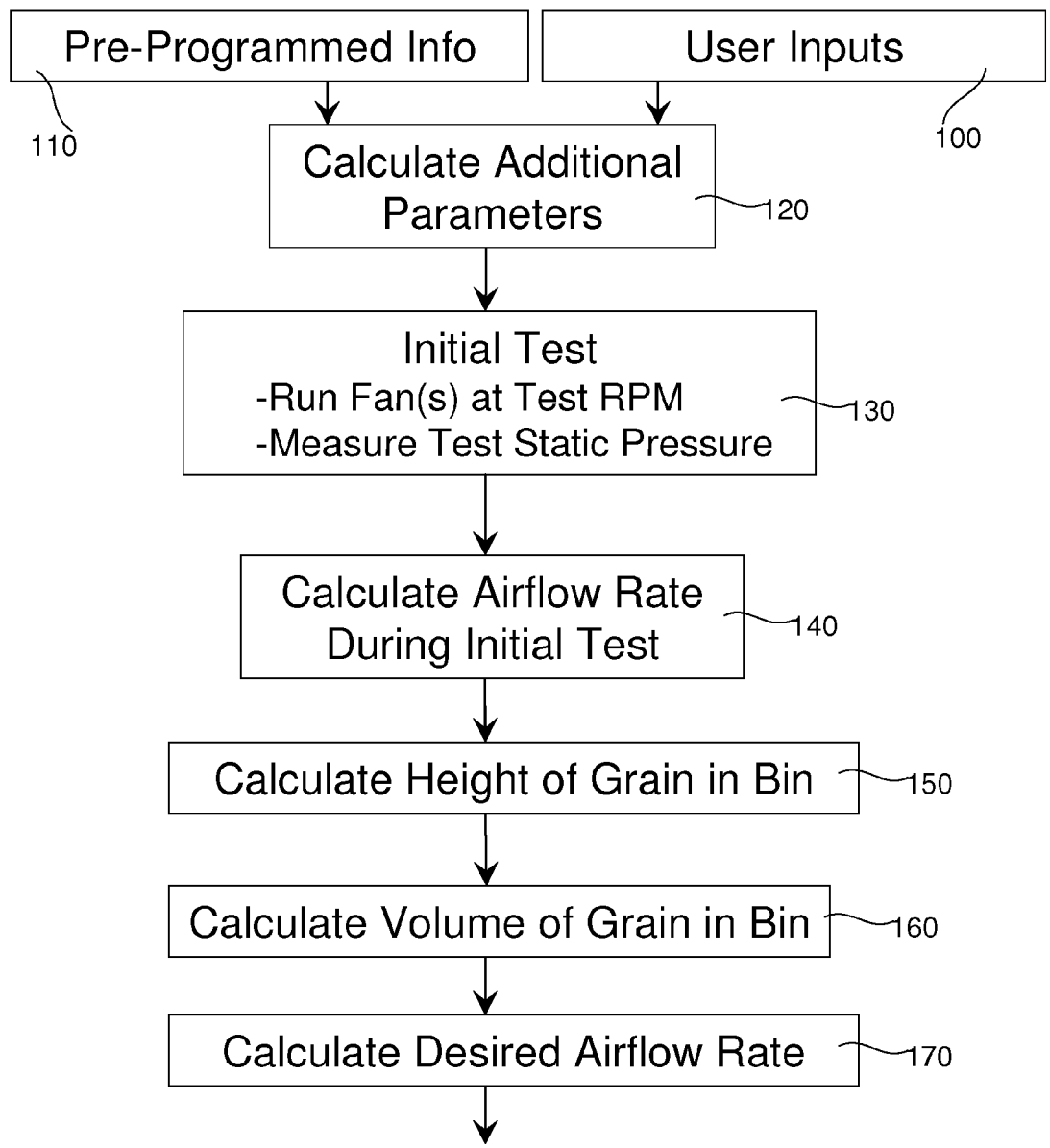
FIG. 2 is an exemplary flow diagram of certain steps of a method and system for controlling aeration of a grain bin storage device.

Referring to FIG. 2, the process and system generally begins with obtaining user input which can include grain bin storage device parameters, as referenced by method box 100 of FIG. 1. In various aspects, the user input and grain bin storage device parameters may include one or more of the grain type and/or grain properties, the moisture content, the degree of grain cleanliness, the grain bin diameter, the maximum grain bin fill height level, the grain bin geometry, the grain bin structural materials, the number and characteristics of the fan(s) being controlled by the controller, airflow resistance due to the configuration of the airflow path, and the desired volumetric airflow rate per bushel of grain (cfm/bu). Certain of these parameters may alternatively be input or otherwise pre-programmed into the controller by the manufacturer, as indicated by method box 110.

These parameters may be inputted via the user or manufacturer directly into the controller, or may be transmitted by other means, such as through a computer system, network, or using wired or wireless internet communications or technologies. In certain aspects, remote processing systems may be used. The user and/or manufacturer inputs can be used to calculate additional parameters as noted by method box 120.

Initially, the ventilation fan is engaged and operated at a predetermined fan test speed as referenced by method box 130. In certain aspects, this predetermined test fan speed may be the maximum operating speed, or a relatively high operating speed for the particular ventilation fan. For example, the predetermined test fan speed can be about 80% of its maximum operating speed. The initial static pressure is then measured within the grain bin storage device at the predetermined test fan speed. This can be accomplished, for example, by using pressure sensor or transducer located at the bin floor level, for example, in the air plenum immediately below the bin floor. The pressure sensor or transducer can alternatively be located in the aeration duct between the fan and the grain, such as at the fan transition. The controller then calculates an initial airflow rate of the ventilation fan based on the predetermined test fan speed and the measured initial static pressure.

As used herein, the term "fan equation" refers to an experimentally determined equation that is obtained by measuring the pressure and flow of the particular ventilation fan being used. An exemplary basic fan equation is as follows, such an equation is determined for a specific fan at its maximum RPM.

$$P = A*Q^2 + B*Q + C$$

Where:
P=pressure
Q=Airflow rate
A, B and C=Coefficients of the fan curve when the fan is operated at its maximum RPM It should be understood, however, that the above fan equation is only valid for one fan speed (RPM). Thus, the fan equation may then be modified to include the fan speed (RPM) as a variable function in order for one to calculate pressure or flow. The fan affinity laws are used to incorporate the fan speed (RPM) into the equation as follows:

$$P = \left(\frac{RPM}{MAXRPM}\right)^2 \left(A\left(Q\frac{MAXRPM}{RPM}\right)^2 + B\left(Q\frac{MAXRPM}{RPM}\right) + C\right)$$

Notably, different sizes and types of fans will have different respective fan curve coefficients (A, B, C) but use the same general equation. In most instances, the controller 26 can calculate the flow (Q) from the pressure (P) and speed (RPM), as referenced in method box 140. This can be calculated using the equation above and solving for airflow rate Q which yields the quadratic equation as follows:

$$Q = \left(\frac{-B - \sqrt{B^2 - 4 \cdot A\left(C - \left(P*\left(\frac{MAXRPM}{RPM}\right)^2\right)\right)}}{2 \cdot A}\right)\left(\frac{RPM}{MAXRPM}\right)$$

Using the flow rate, the controller can determine the grain fill height level within the grain bin storage device. The pressure drop through a grain mass depends on the airflow rate, method of filling, the surface area and shape, configuration of voids, the variability of particle size, grain bed depth and crop moisture content.

The pressure within the plenum may also be affected by the resistance of the airflow path, other than that due to the grain. For example restrictions or obstructions in the overall airflow path from the fan intake to the outlets through which air exits the grain storage bin may also affect the pressure. In such cases, it can be desirable for the user to input a factor which is added as a multiplier to any of the equations provided herein to solve for pressure (P).

As is known in the art, Shedd's Equation is an industry accepted way to predict pressure created when blowing a certain amount of air through a depth of grain. Shedd presented curves relating airflow and pressure drop per unit depth of grain. Thus, if the pressure is known, the depth can likewise be determined. Because of their simplicity and ease of handling, Shedd's curves are widely used by many designers to estimate pressure drops in grains. A standard form of Shedd's Equation is:

$$P = SM \cdot H \frac{(A \cdot v^2)}{\ln(1 + B \cdot v)}$$

Where:
P=Pressure
SM=Shedd's Multiplier
H=Height of the grain in the bin
A=Shedd's Grain Constant
B=Shedd's Grain Constant
v=Air Velocity through grain Using the equation above and solving for the height of the grain in the bin yields:

$$H = \frac{P \cdot \ln(1 + B \cdot v)}{SM \cdot (A \cdot v^2)}$$

As referenced at method box 150, solving the above equation can involve calculating the air velocity through the grain (v) using the following formula:

$$v = \frac{Q}{FloorArea}$$

As an alternative to calculating the height of the grain in the bin as discussed above and referenced as method boxes 130-150, the height of the grain in the bin or fill height can be provided more directly. For example, the fill height could be provided as a user input, or sensors could be provided in the bin that measure or otherwise more directly determine the fill height.

As referenced at method box 160, once the fill height level of the grain bin storage device is obtained, the total volume of grain can be calculated (in bushels) using the following equation:

$$V = FloorArea \cdot H \frac{.8 \; Bu}{ft^3} \cdot PackingFactor$$

Where:
V=Volume of grain in the bin
H=Height of grain in the bin

Multiplying the user inputted desired volumetric airflow rate (cfm/bu) with the volume of grain (V) in the bin (bu) yields the target airflow rate (Q) (cfm) which the fan or fans need to produce, as referenced at method box 170. Several control methods are available for achieving this target airflow rate.

Figure 3:
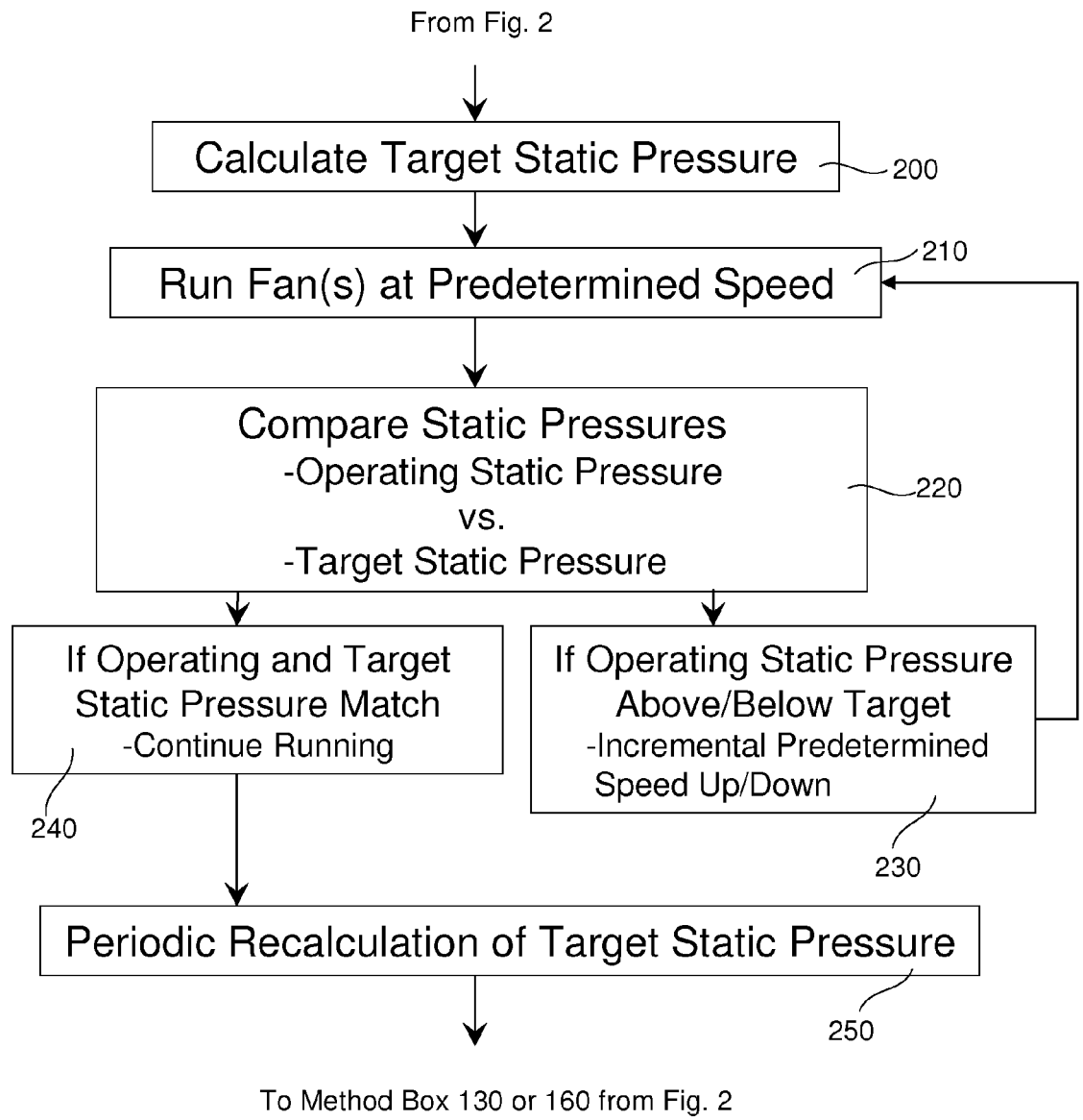
FIG. 3 is an exemplary flow diagram continuing from FIG. 2 of a target pressure method and system for controlling aeration of a grain bin storage device.

Referring to FIG. 3, one control method can involve calculating a target static pressure based upon the target airflow rate (cfm), as referenced by method box 200. This can be done using Shedd's equation and solving for pressure (P) results in the following:

$$P = SM \cdot H \frac{(A \cdot v^2)}{\ln(1 + B \cdot v)}$$

Where:
P=Pressure target
SM=Shedd's Multiplier
H=Height of the grain in the bin
A and B=Shedd's Grain Constants
v=Air Velocity through grain In order to solve the above equation, the air velocity through the grain (v) at the target airflow rate (Q) can be determined using the following formula:

$$v = \frac{Q}{FloorArea}$$

Thus, in certain aspects, the desired airflow rate is empirically determined based on a target pressure corresponding to a desired volumetric flow rate per bushel of grain.

As indicated by method box 210, the fan can then be operated at a predetermined speed. This predetermined speed can be initially selected by the user. Alternatively, it can initially be selected by the controller in response to user input or independent of user input. For example, the controller may be programmed to always start at some percentage of maximum rpm. This percentage can be preprogrammed into the controller by the manufacturer. As yet another alternative, the initial predetermined speed can be calculated by the controller as detailed hereinafter in relation to method box 400 of FIG. 5.

As shown in method box 220, the operating static pressure at the bin floor is measured and the controller 26 can compare this measured value to the calculated target static pressure and either increase or decrease the speed based on the comparison. For example, if the measured operating pressure is above the target static pressure, the fan speed is reduced by a small increment as referenced by method box 230. Likewise, if the measured pressure is below the target static pressure, the fan speed is reduced by a small increment as also referenced by method box 230. A proportional-integral-derivative controller (PID) type fan motor control can be used to provide the small incremental adjustments in fan speed. If the measured pressure is within a predetermined tolerance of target pressure, the fan is maintained at the current speed as referenced by method box 240.

Under certain circumstances, the fill height of the grain in the bin may change during the operation of the fans. For example, operation of the fans may be occurring while grain is being added to, or removed from the grain bin. Thus, it can be desirable to periodically recalculate the target static pressure, or to permit the user to provide a manual input causing recalculation of the target static pressure, as indicated by method box 250. This can include re-calculating the fill height level of the grain bin storage device by returning to method box 130 and repeating the process steps from that point forward. Alternatively, where the height of the grain in the storage bin is more directly determined, then this can include returning to method box 160 and repeating the process steps from that point forward.

Figure 4:
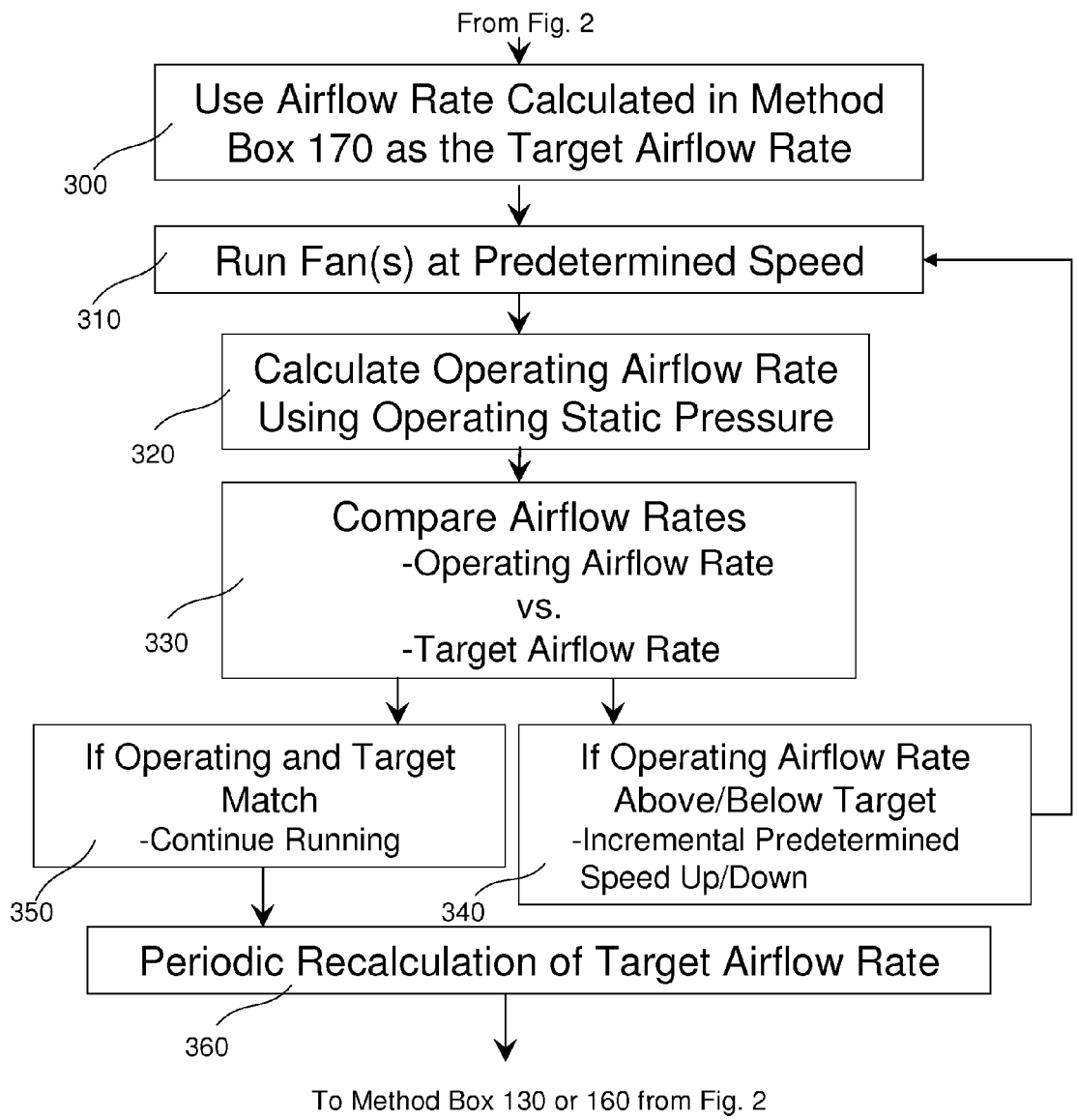
FIG. 4 is an alternative exemplary flow diagram continuing from FIG. 2 of a target airflow method and system for controlling aeration of a grain bin storage device.

Referring to FIG. 4, another control method can involve using the desired volumetric airflow rate calculated by multiplying the user inputted desired airflow rate (cfm/bu) with the number of bushels determined to be in the grain bin as a target airflow rate (cfm). Thus, the airflow rate can be calculated as discussed above regarding method box 170, and this is used by the controller as the target airflow rate as indicated at method box 300.

Similar to the previous control method, the fan is initially run at a predetermined fan speed as indicated by method box 310. As discussed above regarding method box 210, the predetermined speed can be initially selected by user input, manufacturer input or preprogramming, a combination of these. As yet another alternative, the initial predetermined speed can be calculated by the controller as detailed hereinafter in relation to method box 400 of FIG. 5.

Referring to method box 320, the operating pressure is measured in the air plenum below the bin floor and used to calculate the operating airflow rate as follows:

$$Q = \left( \frac{-B - \sqrt{B^2 - 4 \cdot A \left( C - \left( P * \left( \frac{MAXRPM}{RPM} \right)^2 \right) \right)}}{2 \cdot A} \right) \left( \frac{RPM}{MAXRPM} \right)$$

Referring to method box 330, the operating flow rate as calculated with this equation is compared to the target airflow rate (determined above as indicated by method box 300). As represented by method box 340, if the operating airflow rate is above the target airflow rate, the predetermined fan speed of method box 310 is reduced by a small increment. Likewise, if the operating airflow rate is below the target airflow rate, the predetermined fan speed of method box 310 is reduced by a small increment. If the operating airflow rate is within a predetermined tolerance of target airflow rate, the fan is maintained at the current speed as referenced by method box 270. A proportional-integral-derivative controller (PID) type control or other control logic can be used to increment the fan speed up or down.

Referring to method box 350 there can be a need to periodically recalculate the target airflow rate. Similar to the discussion above regarding method box 250, this can include re-calculating the fill height level of the grain bin storage device by returning to method box 130 and repeating the process steps from that point forward. Alternatively, where the height of the grain in the storage bin is more directly determined, then this can include returning to method box 160 and repeating the process steps from that point forward.

Figure 5:
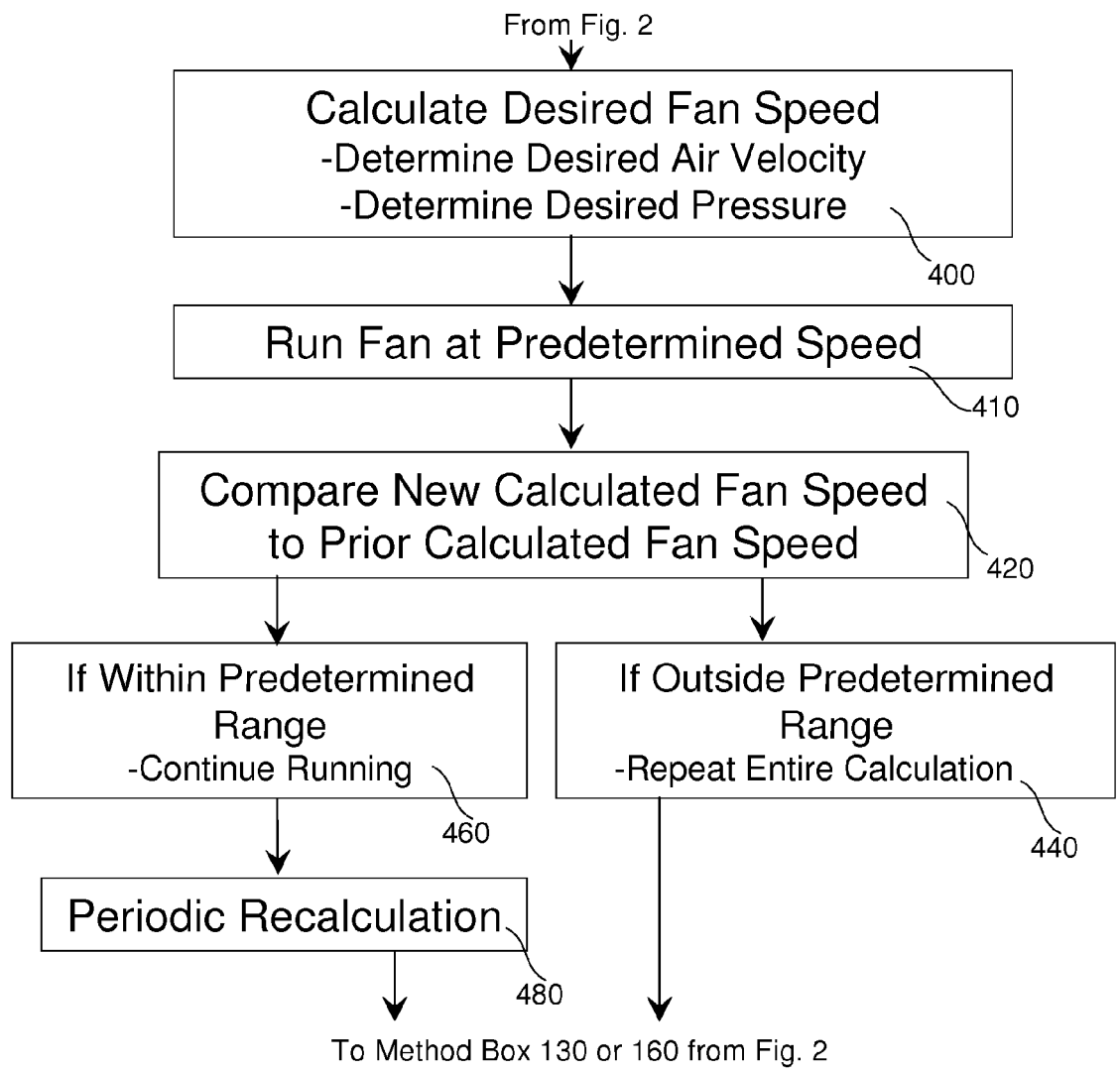
FIG. 5 is yet another alternative exemplary flow diagram continuing from FIG. 2 of a desired fan speed method and system for controlling aeration of a grain bin storage device.

Referring to FIG. 5 yet another control method can involve using the target airflow rate and target static pressure to calculate a desired fan speed (RPM). As referenced by method box 400, the desired fan speed can be calculated using the fan equation and solving for RPM as follows:

$$RPM = \frac{\left( -B \cdot \frac{CFM}{MAXRPM} \right) + \sqrt{\left( B \cdot \frac{CFM}{MAXRPM} \right)^2 - 4 \left( \frac{C}{MAXRPM^2} \right)(A \cdot CFM^2 - P)}}{\left( 2 \cdot \frac{C}{MAXRPM^2} \right)}$$

In order to solve the above equation, the desired pressure (P) can be calculated using the following equation:

$$P = SM \cdot H \frac{(A \cdot v^2)}{\ln(1 + B \cdot v)}$$

Where:
P=Pressure
SM=Shedd's Multiplier
H=Height of the grain in the bin
A and B=Shedd's Grain Constants
v=Air Velocity through grain, which can be calculated using the following equation:

$$v = \frac{Q}{FloorArea}$$

As referenced by method box 410, in certain aspects, a variable frequency drive (VFD) or other mechanism for controlling the fan speed receives an input signal to run the ventilation fan at the desired (RPM) calculated above. The entire process can be repeated until the immediately prior calculated fan speed and the newly calculated fan speed can be compared to each other and until they are within a predetermined range of each other as indicated by method boxes 420 and 440. Once two successive calculation yield fan speeds within the predetermined range of each other, the fan simply continues to run at the fan speed as indicated by method box 460. After a triggering event, such as the passage of a predetermined period of time or user input to the controller, the entire process can be repeated, providing periodic recalculation as indicated by method box 480.

In various aspects, the system may also include a sensor to monitor and/or measure the carbon dioxide percentage levels at predetermined time intervals in order to check for any potential grain or feed spoilage. Upon measuring a carbon dioxide level above a predetermined threshold, the controller will engage the fans at a predetermined maximum allowable aeration rate, regardless of the estimated moisture content (EMC) of the air.

Another control strategy in which the calculations above are done previously so that the resulting data can be curve fit into an equation and put into the controller. In other words, for a given grain storage bin diameter, grain type, and desired airflow (cfm/bu), there exists a curve that would provide the ideal static pressure at any fan speed. This curve can be represented, for example by the equation P=k* (RPM)$^2$ The fan speed could then be adjusted until the actual pressure matches this "Ideal Pressure" as represented by the curve.

Figure 6:
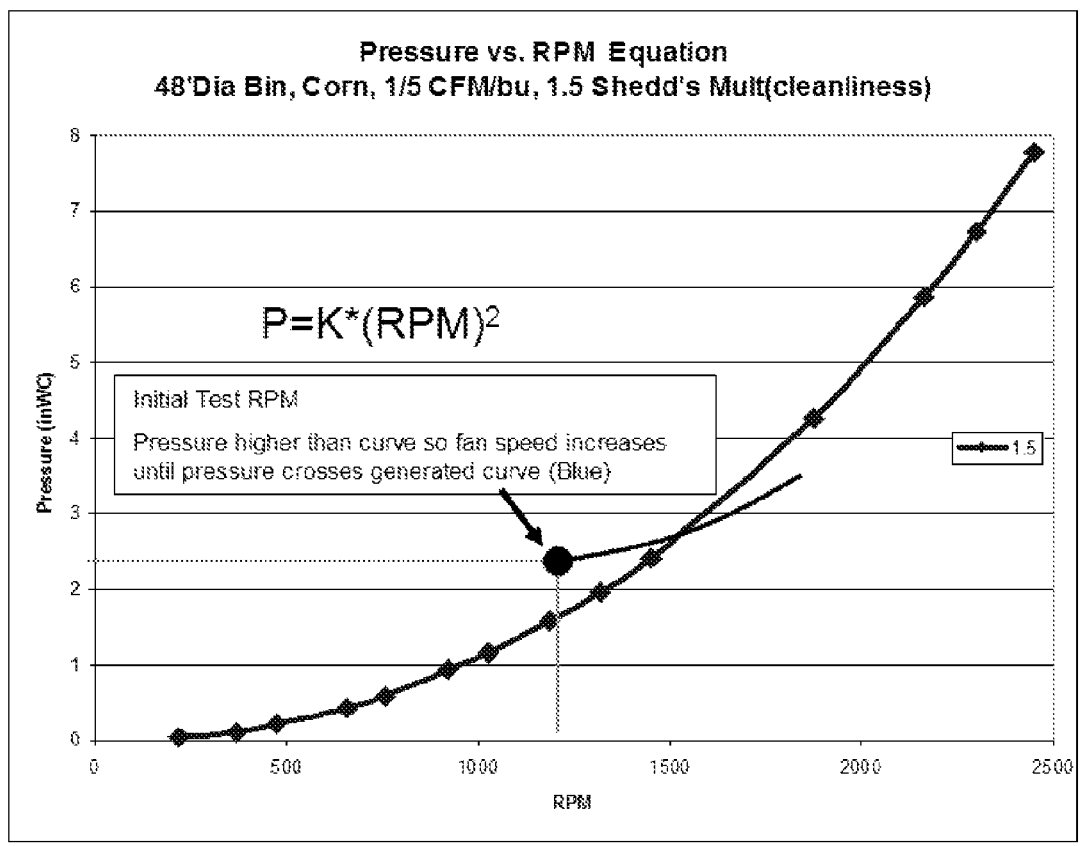
FIG. 6 is a graph indicating an exemplary fan equation curve for a specific set of parameters.

FIG. 6 represents an example of such an empirical relationship. By way of example, if the ventilation fan is running at a certain speed (RPM), an AC drive can compare the running pressure of the ventilation fan to what the ideal pressure should be, based on the curve fit equation. If the operating pressure is above the ideal pressure, this indicates that there is more grain in the bin than expected and the fan speed will increase. Alternatively, if the operating pressure is lower than the ideal pressure, this indicates that there is less grain in the bin than expected and the fan speed will decrease. As with the control strategies discussed previously, the fan speed should be adjusted in small increments until the measured pressure at the operating fan speed (rpm) falls on, or sufficiently close to the curve.

In various aspects of the present technology, double wide double inlet (DWDI) fans are used and may be preferred. DWDI fans are typically more efficient than single inlet fans; they run at lower speeds and are more quiet. In general, DWDI fans may be physically located closer to the bin, thus using smaller fan transition ducts. In one embodiment, a DWDI fan may be built as part of the transition. The transition ducts may generally take the shape of a rectangular, cylindrical, or oval cross-section that fluidly connects a fan housing with an enclosure wall of a bin or storage structure. Smaller transition ducts reduce load and facilitate lower manufacturing costs. Fan motors may be provided on top of the transition duct and would drive the fan with belts. The speed may be controlled with a variable frequency drive that obtains its input from a pressure transducer also mounted in the transition. For example, the input from the pressure transducer would go to a microprocessor that would calculate the bin fill level, as described below, and output the resulting optimum speed to the variable frequency drive. In certain embodiments, the variable frequency drive or other fan speed control mechanism is provided with its own microprocessor.

In certain aspects, a plurality of separate fans may be provided. In these embodiments, the fans may share a motor, controlled by the methods of the present disclosure, or may each be operated by a separate motor controlled by a single controller. In the case of multiple fans, it may be desirable that all of the fans are of the same size and type, and are all controlled to run as the same speed. In addition, various other sensors such as temperature sensors positioned to measure the temperature of the stored grain, sensors to measure barometric pressure, static pressure, feedback sensors that account for heat produced by the fans. One preferred method of mounting a fan to a bin is to suspend the fan (optionally including the motor and transition) with cables from a side wall of the bin while the delivery end of the transition rests on the concrete floor of the bin. This may locate the fan motor weight away from the bin with minimal loads on the cables.

An example of the calculations which may be used in connection with the process as illustrated in FIGS. 2 and 3 using a target pressure control scheme follows.
Inputs Programmed into Controller
  1. Fan Curve
    A. =−5.96 e^−8
    B. =8.85 e^−4
    C. =1.11 e^1
Fan Inputs from User
  1. Diameter of Bin=48 Feet
  2. Grain Type=Corn
  3. Airflow Rate=0.25 cfm/Bu
  4. Shedd's Multiplier 1.5
Parameters Calculated/Resulting from These Inputs
  1. Floor Area=1809.5 ft^2
  2. Shedd's A=0.00065
  3. Shedd's B=0.1544

Initial Test
Fan Speed=2000 RPM
Static Pressure=3.5− H2O
Calculate Airflow Rate
This equation relates pressure, RPM, and airflow.

$$P = \left(\frac{RPM}{MAXRPM}\right)^2 \left(A\left(Q\frac{MAXRPM}{RPM}\right)^2 + B\left(Q\frac{MAXRPM}{RPM}\right) + C\right)$$

A, B, and C are coefficients of the fan curve when the fan is operated at its maximum RPM
Knowing the Pressure and RPM, we can solve this equation for airflow using the Quadratic Formula.

$$Q = \left(\frac{-B - \sqrt{B^2 - 4\cdot A\left(C - \left(P*\left(\frac{MAXRPM}{RPM}\right)^2\right)\right)}}{2\cdot A}\right)\left(\frac{RPM}{MAXRPM}\right)$$

Plugging in the values gives Q=17,613 cfm
Find Height of Grain in the Bin Using Shedd's Equation
The standard form of Shedd's Equation is:

$$P = SM \cdot H \frac{(A \cdot v^2)}{\ln(1 + B \cdot v)}$$

P=Pressure
SM=Shedd's Multiplier
H=Bin Height
A=Shedd's Grain Constant
B=Shedd's Grain Constant
v=Air Velocity through grain
Air velocity is:

$$v = \frac{Q}{FloorArea} = \frac{17613}{1809.5} = 9.73 \text{ ft/min}$$

Solving for grain height in the bin gives us:

$$H = \frac{P \cdot \ln(1 + B \cdot v)}{SM \cdot (A \cdot v^2)}$$

$$H = \frac{3.5 \cdot \ln(1 + 0.155 \cdot 9.73)}{1.5 \cdot (.000654 \cdot 9.73^2)} = 34.6 \text{ ft}$$

Calculate Volume of Grain in Bushels $$V = FloorArea \cdot H \frac{.8 \text{ Bu}}{\text{ft}^3} \cdot PackingFactor$$

With a 1.06 packing factor:

$$V = 1809.5 \cdot 34.6 \frac{.8 \text{ Bu}}{\text{ft}^3} \cdot 1.06 = 53092 \text{ Bu}$$

Calculate Desired CFM
  DesiredAirflowRate·Bu=DesiredCFM
  0.25·53,092=13,273 CFM Calculate the Target Pressure For this method we must calculate the approximate static pressure that will result at the target CFM. This static pressure will serve as the target when increasing and decreasing the fan speed, possibly using a PID type control.

Air velocity is:

$$v = \frac{Q}{FloorArea} = \frac{13273}{1809.5} = 7.335 \text{ ft/min}$$

Using Shedd's to calculate target Static Pressure:

$$P = SM \cdot H \frac{(A \cdot v^2)}{\ln(1 + B \cdot v)}$$

P=Pressure
SM=Shedd's Multiplier
H=Bin Height
A=Shedd's Grain Constant
B=Shedd's Grain Constant
v=Air Velocity through grain $$P = 1.5 \cdot 34.6 \frac{(.000654 \cdot 7.335^2)}{\ln(1 + 0.1544 \cdot 7.335)} = 2.41'' \text{ H}_2\text{O}$$

Control Based Upon the Target Pressure

After each change in fan speed, the new pressure is compared to the target pressure calculated in the above step.

An example of the calculations which may be used in connection with the process as illustrated in FIGS. 2 and 4 using a target airflow control scheme follows.

Inputs Programmed into Controller
  1. Fan Curve
    D. =−5.96 e^−8
    E. =8.85 e^−4
    F. =1.11 e^1
Fan Inputs from User
  1. Diameter of Bin=48 Feet
  2. Grain Type=Corn
  3. Airflow Rate=0.25 cfm/Bu
  4. Shedd's Multiplier 1.5
Parameters Calculated/Resulting from These Inputs
  1. Floor Area=1809.5 ft^2
  2. Shedd's A=0.00065
  3. Shedd's B=0.1544
Initial Test
Fan Speed=2000 PRM
Static Pressure=3.5" H2O
Calculate Airflow Rate This equation relates pressure, RPM, and airflow.

$$P = \left(\frac{RPM}{MAXRPM}\right)^2 \left(A\left(Q\frac{MAXRPM}{RPM}\right)^2 + B\left(Q\frac{MAXRPM}{RPM}\right) + C\right)$$

A, B, and C are coefficients of the fan curve when the fan is operated at its maximum RPM Knowing the Pressure and RPM, we can solve this equation for airflow using the Quadratic Formula.

$$Q = \left(\frac{-B - \sqrt{B^2 - 4 \cdot A \left(C - \left(P * \left(\frac{MAXRPM}{RPM}\right)^2\right)\right)}}{2 \cdot A}\right)\left(\frac{RPM}{MAXRPM}\right)$$

Plugging in the values gives Q=17,613 cfm

Find Grain Height in the Bin Using Shedd's Equation

The standard form of Shedd's Equation is:

$$P = SM \cdot H \frac{(A \cdot v^2)}{\ln(1 + B \cdot v)}$$

P=Pressure
SM=Shedd's Multiplier
H=Bin Height
A=Shedd's Grain Constant
B=Shedd's Grain Constant
v=Air Velocity through grain Air velocity is:

$$v = \frac{Q}{FloorArea} = \frac{17613}{1809.5} = 9.73 \text{ ft/min}$$

Solving for Grain Height in the Bin gives us:

$$H = \frac{P \cdot \ln(1 + B \cdot v)}{SM \cdot (A \cdot v^2)}$$

$$H = \frac{3.5 \cdot \ln(1 + 0.1544 \cdot 9.73)}{1.5 \cdot (.000654 \cdot 9.73^2)} = 34.6 \text{ ft}$$

Calculate Volume of Grain in Bushels $$V = FloorArea \cdot H \frac{.8 \text{ Bu}}{\text{ft}^3} \cdot PackingFactor$$

With a 1.06 packing factor:

$$V = 1809.5 \cdot 34.6 \frac{.8 \text{ Bu}}{\text{ft}^3} \cdot 1.06 = 53092 \text{ Bu}$$

Calculate Target CFM

DesiredAirflowRate·Bu=DesiredCFM 0.25·53,092=13,273 CFM

Control Based on Target Airflow

For this example of the method, one would just compare actual CFM to the target CFM, and would increment or decrement the fan speed using a PID type control.

The fan speed is increased/decreased and the new pressure is used to calculate the new CFM and it is again compared to the desired CFM of 13,273 CFM.

The actual CFM after adjustment is calculated as was done above to calculate the target CFM using:

$$Q = \left( \frac{-B - \sqrt{B^2 - 4 \cdot A \left( C - \left( P * \left( \frac{MAXRPM}{RPM} \right)^2 \right) \right)}}{2 \cdot A} \right) \left( \frac{RPM}{MAXRPM} \right)$$

An example of the calculations which may be used in connection with the process as illustrated in FIGS. 2 and 5 using a calculated fan speed control scheme follows.

Inputs Programmed into Controller
1. Fan Curve
G. =−5.96 e^−8
H. =8.85 e^−4
I. =1.11 e^1

Fan Inputs from User
1. Diameter of Bin=48 Feet
2. Grain Type=Corn
3. Airflow Rate=0.25 cfm/Bu
4. Shedd's Multiplier 1.5

Parameters Calculated/Resulting from These Inputs
1. Floor Area=1809.5 ft^2
2. Shedd's A=0.00065
3. Shedd's B=0.1544

Initial Test
Fan Speed=2000 PRM
Static Pressure=3.5" H2O

Calculate Airflow Rate

This equation relates pressure, RPM, and airflow.

$$P = \left( \frac{RPM}{MAXRPM} \right)^2 \left( A \left( Q \frac{MAXRPM}{RPM} \right)^2 + B \left( Q \frac{MAXRPM}{RPM} \right) + C \right)$$

A, B, and C are coefficients of the fan curve when the fan is operated at its maximum RPM Knowing the Pressure and RPM, we can solve this equation for airflow using the Quadratic Formula.

$$Q = \left( \frac{-B - \sqrt{B^2 - 4 \cdot A \left( C - \left( P * \left( \frac{MAXRPM}{RPM} \right)^2 \right) \right)}}{2 \cdot A} \right) \left( \frac{RPM}{MAXRPM} \right)$$

Plugging in the values gives Q=17,613 cfm
Find Height of Grain in the Bin Using Shedd's Equation
The standard form of Shedd's Equation is:

$$P = SM \cdot H \frac{(A \cdot v^2)}{\ln(1 + B \cdot v)}$$

P=Pressure
SM=Shedd's Multiplier
H=Bin Height
A=Shedd's Grain Constant
B=Shedd's Grain Constant
v=Air Velocity through grain
Air velocity is:

$$v = \frac{Q}{FloorArea} = \frac{17613}{1809.5} = 9.73 \text{ ft/min}$$

Solving Shedd's Equation for Grain Height in the Bin gives us:

$$H = \frac{P \cdot \ln(1 + B \cdot v)}{SM \cdot (A \cdot v^2)}$$

$$H = \frac{3.5 \cdot \ln(1 + 0.1544 \cdot 9.73)}{1.5 \cdot (.000654 \cdot 9.73^2)} = 34.6 \text{ ft}$$

Calculate Volume of Grain in Bushels $$V = FloorArea \cdot H \frac{.8 \text{ Bu}}{\text{ft}^3} \cdot PackingFactor$$

With a 1.06 packing factor:

$$V = 1809.5 \cdot 34.6 \frac{.8 \text{ Bu}}{\text{ft}^3} \cdot 1.06 = 53092 \text{ Bu}$$

Calculate Desired CFM

DesiredAirflowRate·Bu=DesiredCFM 0.25·53,092=13,273 CFM

Use Shedd's to Find the Static Pressure Required to Push this CFM Through the Grain Mass.

$$v = \frac{Q}{FloorArea} = \frac{13273}{1809.5} = 7.337 \text{ ft/min}$$

$$P = SM \cdot H \frac{(A \cdot v^2)}{\ln(1 + B \cdot v)}$$

$$P = 1.5 \cdot 34.6 \frac{(.000654 \cdot 7.337^2)}{\ln(1 + 0.1544 \cdot 7.337)} = 2.4'' \text{ H2O}$$

Now Use Fan Equation to Determine Fan Speed Required for this CFM and Pressure $$RPM = \frac{\left( -B \cdot \frac{CFM}{MAXRPM} \right) + \sqrt{\left( B \cdot \frac{CFM}{MAXRPM} \right)^2 - 4 \left( \frac{C}{MAXRPM^2} \right)(A \cdot CFM^2 - SP)}}{\left( 2 \cdot \frac{C}{MAXRPM^2} \right)}$$

Plugging the values into this equation gives RPM=1544
Control Based on Fan Speed In this example one could simply adjust fan speed to this calculated value. In theory, this RPM would always result in the desired CFM. However, because the theoretical equations used will almost certainly not exactly match the actual behavior of the system, one can therefore repeat the entire process until the newly calculated speed is within a predetermined range of the previously calculated fan speed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Non-Limiting Discussion of Terminology:

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Importantly, the method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for controlling aeration of a grain bin storage device having grain bin storage device parameters, the method comprising:
    (a) receiving user input information into a controller, the user input information including the grain bin storage device parameters;
    (b) determining a fill height level of the grain bin storage device by operating a variable speed fan at a predetermined test speed and measuring a corresponding operating static pressure within the grain bin storage device and determining the fill height level of the grain bin storage device based on the corresponding operating static pressure measured at the predetermined test speed;
    (c) determining a desired grain aeration airflow rate within the grain bin storage device based on the fill height level of the grain bin storage device determined in (b) by operating the variable speed fan at the predetermined test fan speed;
    (d) determining a control parameter target having a mathematical relationship to the operating static pressure within the grain bin storage device, wherein the control parameter target is calculated to achieve the desired grain aeration airflow rate determined in (c) based on the fill height level of the grain bin storage device determined in (b) by operating the variable speed fan at the predetermined test fan speed;
    (e) outputting a signal adjusting the speed of the variable speed fan to a first of a plurality of operating fan speeds of the variable speed fan;
    (f) receiving an input measuring an operating static pressure and providing a signal representative of the operating static pressure within the grain bin storage device to the controller;
    (g) determining an operating control parameter based on the operating static pressure within the grain bin storage device, wherein the operating control parameter has the same mathematical relationship to the operating static pressure as the control parameter target;
    (h) comparing the operating control parameter to the control parameter target to selectively generate a signal operating the variable speed fan at a second of a plurality of operating fan speeds to cause the operating control parameter to move toward the control parameter target calculated to achieve the desired grain aeration airflow rate determined based upon the fill height level of the grain bin storage device determined in (b) by operating the variable speed fan at the predetermined test fan speed; and
    (i) repeating steps (b)-(h).

2. The method of claim 1, wherein the control parameter target is a target pressure, and the operating control parameter is an operating pressure.

3. The method of claim 1, wherein the control parameter target is a target airflow rate, and the operating control parameter is an operating airflow rate.

4. The method of claim 1, wherein the control parameter target is a target fan speed, and the operating control parameter is an operating fan speed.

5. The method of claim 1, wherein steps (b)-(h) are repeated after the passage of a predetermined time interval.

6. The method of claim 1, wherein adjusting the speed of the variable speed fan to a first of a plurality of operating fan speeds comprises:
(a) determining a desired pressure required to push the desired airflow rate through a grain volume present in the grain bin storage device; and
(b) determining the one of the plurality of operating fan speeds based upon the desired pressure within the grain bin storage device and the desired airflow rate.

7. A method for controlling aeration of a grain bin storage device having grain bin storage device parameters, the method comprising:
(a) receiving user input information into a controller, the user input information including the grain bin storage device parameters;
(b) outputting a signal operable to operate a variable speed fan at a predetermined test fan operating speed;
(c) receiving an input measuring a corresponding test static pressure within the grain bin storage device at the predetermined test fan operating speed and providing a signal representative of the corresponding test static pressure to the controller;
(d) determining a corresponding test airflow rate of the variable speed fan based on the predetermined test fan operating speed and the corresponding test static pressure;
(e) determining a fill height level of the grain bin storage device based upon the corresponding test airflow rate determined in (d);
(f) determining a desired grain aeration airflow rate within the grain bin storage device based on the fill height level of the grain bin storage device determined in (e) based on the corresponding test airflow rate determined in (d) based on the predetermined test fan operating speed and the corresponding test static pressure;
(g) calculating a control parameter target having a mathematical relationship to a static pressure within the grain bin storage device, wherein the control parameter target is calculated to achieve the desired grain aeration airflow rate determined in (f) based on the fill height level of the grain bin storage device determined in (e) based on the corresponding test airflow rate determined in (d) based upon the predetermined test fan operating speed and the corresponding test static pressure;
(h) outputting a signal adjusting the speed of the variable speed fan to a first of a plurality of operating fan speeds of the variable speed fan;
(i) receiving an input measuring an operating static pressure and providing a signal representative of the operating static pressure within the grain bin storage device to the controller;
(j) determining an operating control parameter based on the operating static pressure within the grain bin storage device, wherein the operating control parameter has the same mathematical relationship to the static pressure as the control parameter target;
(k) comparing the operating control parameter to the control parameter target to selectively generate a signal operating the variable speed fan at a second of a plurality of operating fan speeds to cause the operating control parameter to move toward the control parameter target calculated in (g) to achieve the desired grain aeration airflow rate determined in (f) based upon the fill height level of the grain bin storage device determined in (e) based on the corresponding test airflow rate determined in (d) based upon the predetermined test fan operating speed and the corresponding test static pressure; and
(l) repeating steps (b)-(k).

8. The method of claim 7, wherein the control parameter target is a target pressure, and the operating control parameter is an operating pressure.

9. The method of claim 7, wherein the control parameter target is a target airflow rate, and the operating control parameter is an operating airflow rate.

10. The method of claim 7, wherein the control parameter target is a target fan speed, and the operating control parameter is an operating fan speed.

11. The method of claim 7, wherein the triggering event is passage of a predetermined time interval.

12. The method of claim 7, wherein adjusting the speed of the variable speed fan to a first of a plurality of operating fan speeds comprises:
(a) determining a desired pressure required to push the desired airflow rate through a grain volume present in the grain bin storage device; and
(b) determining the one of the plurality of operating speeds based upon the desired pressure and the desired airflow rate.

13. A system to control aeration of a grain bin storage device including a variable speed fan and a static pressure sensor within the grain bin storage device having grain bin storage device parameters, the system comprising:
a controller programmed to:
(a) receive a plurality of user inputs, the user input including the grain bin storage device parameters;
(b) determining a volume of grain in the grain bin storage device by operating a variable speed fan at a predetermined test speed and measuring a corresponding operating static pressure within the grain storage bin device and determining the volume of grain in the grain bin storage device based on the corresponding operating static pressure measured at the predetermined test speed;
(c) determining a desired grain aeration airflow rate to be produced by the variable speed fan based upon at least one of the plurality of user inputs and the volume of grain present in the grain bin storage device determined in (b) by operating the variable speed fan at the predetermined test fan speed;
(d) receive input from the pressure sensor within the grain bin storage device;
(e) generating a plurality of sequential control signals based on an operating pressure within the grain storage bin and a corresponding operating airflow rate to operate the variable speed fan at a plurality of sequential operating speeds approaching the desired grain aeration airflow rate determined in (c) based upon the at least one of the plurality of user inputs and the volume of grain present in the grain bin storage device determined in (b) by operating the variable speed fan at the predetermined test fan speed.

14. The system of claim 13, wherein generating a plurality of sequential control signals based on the pressure within the grain storage bin and the airflow rate to operate the variable speed fan at the plurality of sequential operating speeds approaching the desired airflow rate comprises:
(a) determining a target pressure, to achieve the desired airflow rate;
(b) determining an operating pressure based upon input from the pressure sensor within the grain bin storage device;

(c) comparing the operating pressure to the target pressure and selectively operating the variable speed fan at a sequential one of a plurality of operating fan speeds to cause the operating pressure to move toward the target pressure.

15. The system of claim 13, wherein generating a plurality of sequential control signals based on the pressure within the grain storage bin and the airflow rate to operate the variable speed fan at the plurality of sequential operating speeds approaching the desired airflow rate comprises:
   (a) using the desired airflow rate as a target airflow rate;
   (b) determining an operating airflow rate based upon the operating pressure derived from input from the pressure sensor;
   (c) comparing the operating airflow rate to the target airflow rate and selectively operating the variable speed fan at a sequential one of a plurality of operating fan speeds to cause the operating airflow rate to move toward the target airflow rate.

16. The system of claim 13, wherein generating a plurality of sequential control signals based on the pressure within the grain storage bin and the airflow rate to operate the variable speed fan at the plurality of sequential operating speeds approaching the desired airflow rate comprises:
   (a) determining a desired pressure required to obtain the desired airflow rate through the volume of grain present in the grain bin storage device; and
   (b) determining a desired fan speed based upon the desired pressure and the desired airflow rate.

17. The system of claim 13, wherein the controller being further programmed to (a) operate the variable speed fan at a test fan operating speed;
   (b) determine a test static pressure within the grain bin storage device at the test fan operating speed from a signal representative of the test static pressure within the grain bin storage device received by the controller;
   (c) determine a test airflow rate based on the test fan operating speed and test static pressure;
   (d) determine the fill height level of the grain bin storage device based upon the test airflow rate; and
   (e) determine the volume of grain present in the grain storage bin based upon the fill height level of the grain bin storage device.

18. The system of claim 17, wherein generating a plurality of sequential control signals based on the pressure within the grain storage bin and the airflow rate to operate the variable speed fan at the plurality of sequential operating approaching the desired airflow rate comprises:
   (a) determining a target pressure, to achieve the desired airflow rate;
   (b) determining an operating pressure within the grain bin storage device based upon input from the pressure sensor;
   (c) comparing the operating pressure to the target pressure and selectively operating the variable speed fan at a sequential one of a plurality of operating fan speeds to cause the operating pressure to move toward the target pressure.

19. The system of claim 17, wherein generating a plurality of sequential control signals based on the pressure within the grain storage bin and the airflow rate to operate the variable speed fan at the plurality of sequential operating speeds approaching the desired airflow rate comprises:
   (a) using the desired airflow rate as a target airflow rate;
   (b) determining an operating airflow rate based upon the operating pressure derived from input from the pressure sensor;
   (c) comparing the operating pressure to the target pressure and selectively operating the variable speed fan at a sequential one of a plurality of operating fan speeds of the variable speed fan to cause the operating pressure to move toward the target pressure.

20. The system of claim 17, wherein generating a plurality of sequential control signals based on the pressure within the grain storage bin and the airflow rate to operate the variable speed fan at the plurality of sequential operating speeds the desired airflow rate comprises:
   (a) determining a desired pressure required to obtain the desired airflow rate through the volume of grain present in the grain bin storage device; and
   (b) determining a desired fan speed based upon the desired pressure and the desired airflow rate.

* * * * *